G. J. BRYEN.
STOP MECHANISM FOR SHEARS.
APPLICATION FILED AUG. 17, 1911.
1,012,805.
Patented Dec. 26, 1911.
2 SHEETS—SHEET 2.
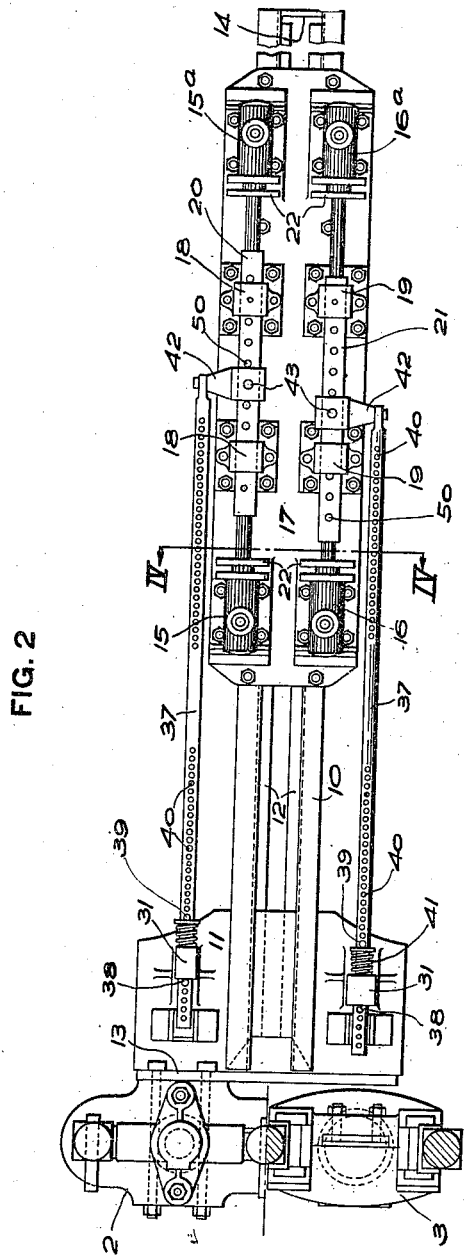
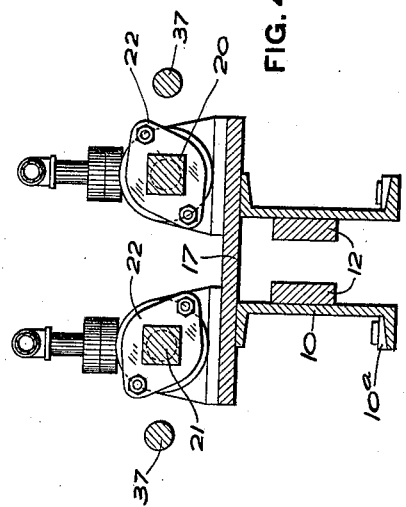
WITNESSES
INVENTOR
George J. Bryen

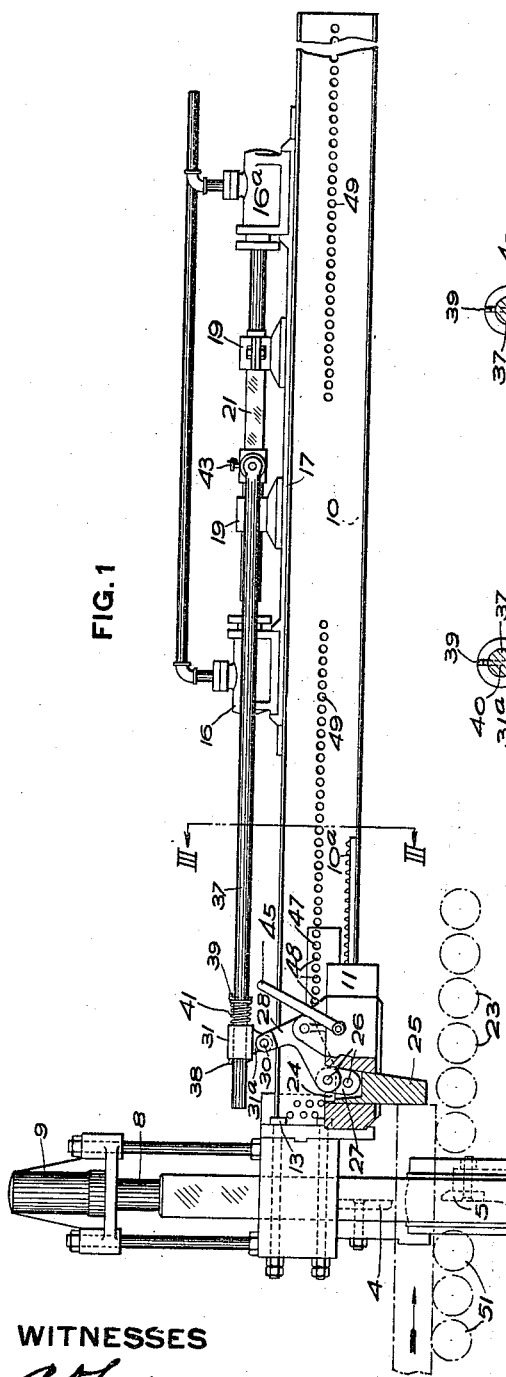

UNITED STATES PATENT OFFICE.

GEORGE J. BRYEN, OF DUQUESNE, PENNSYLVANIA.

STOP MECHANISM FOR SHEARS.

1,012,805.  Specification of Letters Patent.  Patented Dec. 26, 1911.

Application filed August 17, 1911. Serial No. 644,695.

*To all whom it may concern:*

Be it known that I, GEORGE J. BRYEN, a citizen of the United States, residing at Duquesne, in the county of Allegheny, State of Pennsylvania, have invented certain new and useful Improvements in Stop Mechanism for Shears, of which the following is a specification.

My invention relates to shear stops used in conjunction with shearing apparatus employed to cut long pieces of metal, such as multiple length billets, slabs, blooms, and similar materials, to arrest the longitudinal movement of the uncut portions of the materials necessarily imparted thereto after each of the successive shearing operations to which the uncut materials are subjected in severing such multiple length materials into a series of shorter pieces having a pre-determined length.

One object of my invention is to provide a stop mechanism for shearing apparatus having a stopping block arranged to move into and out of operative position on its carrier and having novel means for adjusting the stopping block and carrier toward and away from the knives or cutters of the shearing apparatus to vary the length of the pieces into which the multiple length materials being sheared are cut by the shearing apparatus.

Another object of the invention is to provide a stop mechanism for shearing apparatus having improved actuating mechanism for the stopping block whereby the shear stop is moved out of the path of lengthwise movement of the pieces of sheared materials and whereby the stop is shifted into and out of operative position while held in any of the series of positions into which the stopping block is adjusted in cutting or shearing the materials into pieces of varying length.

A further object of this invention is to provide a stopping block and stop holding mechanism of novel construction having improved means whereby the stopping block is rigidly held in position and is adapted to be readily released and moved into its inoperative position by the actuating mechanism for the stopping block.

A still further object of my invention is to provide a horizontally adjustable stopping block support or carrier adapted to engage with and limit vertical movement of the forward end of the metal being severed during the severing or cutting operations.

A still further object of the invention is to provide a shear stop and shear mechanism for a duplex or double shear having a novel combination and arrangement of the parts forming the stop mechanism, as will appear more fully hereinafter.

Referring to the drawings, forming part of this specification, Figure 1 is a longitudinal side elevation of a duplex shear and shear stop mechanism constructed and arranged in accordance with my invention. Fig. 2 is a plan of the apparatus shown in Fig. 1. Fig. 3 is a transverse section on the line III—III of Fig. 1 showing the manner in which the adjustable cross head or stop carrier and stop are adjustably supported. Fig. 4 is a transverse section on the line IV—IV of Fig. 2 showing the operating cylinders forming part of the stop actuating mechanism, as mounted upon the stationary slide support for the overhung cross heads or block carriers and stopping blocks.

In the accompanying drawings, the numerals 2 and 3 designate the cutting mechanism forming the duplex shear. The cutting devices are arranged side by side and are of the hydraulic type in which the top shear knife 4 is stationary and the bottom shear knife 5 is arranged to be moved vertically in severing the metal into pieces. A hydraulic cylinder 6 which is mounted upon a stationary plunger 7 and to which the movable shear knife 5 is removably secured is employed to actuate the movable shear knife 5 through its cutting stroke and a plunger 8 in the pull-back cylinder 9 is provided to move the knife 5 in the opposite direction.

Secured by one end to the delivery side of the shear and extending horizontally in front thereof is a built-up beam or girder 10 forming a hollow support for the stop carrier or cross-head 11 which is arranged to be moved horizontally on the support 10 and to be secured in any position to which it is adjusted in the length of this cross-head support.

The crosshead 11 has a T-shaped portion 11ª which engages with ways or slides 12 mounted on the sides of the support 10 between the beams forming the support. As shown, the support 10 is formed of two rolled channel beams which are held in their spaced-apart relation at one end thereof by means of the connecting plate 13. The plate 13 is also used to provide means by which the support is also secured to the shears. A separator or spreader 14 on the other end of the support 10 is provided to maintain the beams forming the support in their spaced-apart position.

Secured on the upper surface of the lower flanges of the channels forming the support 10 is a segmental rack 10$^a$ having teeth which engage with the teeth of spur pinions mounted on the crosshead 11 for a purpose described later.

Secured thereon, at an intermediate point in the length of the crosshead support 10, are two pairs of oppositely facing single acting hydraulic cylinders 15, 15$^a$, and 16, 16$^a$. A suitable base plate 17 is secured on the top flanges of the channel beams forming the support 10 to which the cylinders 15, 15$^a$ and 16, 16$^a$ are secured; and also secured on this base plate 17 are guides 18, 18, and 19, 19, in which are movably secured the plungers 20 and 21 for the cylinders.

The plungers 20 and 21 have end portions, which are cylindrical in cross section and have an intermediate portion which is rectangular in cross section, the rectangular portion of the plungers sliding in the bearings or guides 18 and 19. The cylinders are provided with the usual stuffing boxes in which glands 22 are mounted.

The crosshead 11 is arranged to extend transversely on the support 10 in such manner that its opposite ends overhang the roller delivery tables 23 on which the sheared materials are delivered from the shears 2 and 3. Located in each overhanging end of the crosshead 11 is a vertically extending recess or hole 24 into which the vertically movable stopping blocks 25 are mounted. The stopping blocks 25 are wedge-shaped longitudinally and the engaging faces of the openings 24 in the crosshead are similarly tapered so that the stopping blocks 25 when moved downwardly within the holes 24 in the crosshead 11 will be rigidly held in stopping position on the crosshead above the feed roller table and in front of the line of travel of materials emerging lengthwise from the shears.

The upper end of each stopping block 25 is connected by pins 26 and links 27 with the outer end of the lower lever arm of the bell crank 28. The bell crank 28 is pivotally secured by the pin 29 to the crosshead 11 and the upper end of the other arm of the bell crank 28 is secured by the pin 30 to the lug 31$^a$ on the sleeves 31 which are secured on the reach rods 37 so as to be adjustable along the length of the reach rod. Pins 38 and 39 which engage in the holes 40 provided in the reach rods 37 are employed to hold the sleeve 31 in the desired adjusted position on the reach rods.

In some cases it is possible that one of the reach rods will be actuated by the operating cylinders in a direction to move the shear stop downwardly, before the sheared material has passed from under the then lifted stopping block 25, and, to prevent damage to the apparatus in such case, the helical springs 41 are provided between the pins 39 and the sleeve 31 on the reach rod, so that the rods 37 can be actuated or moved longitudinally without necessarily moving the sleeve 31 and, through the connecting mechanism, its shear stop 25 until after the feed roller table 23 has moved sheared materials beneath the stopping blocks 25 out of the downward path of these blocks.

One end of each reach rod is pivoted to a connecting arm 42 which is adjustably mounted on the squared middle portion of the plungers 20 or 21, a removable pin 43 being provided to extend through the holes in register in the arm 42 and plunger 20 or 21, and secure the arms 43 in adjusted position thereon.

The fluid pressure cylinders 15 and 15$^a$, 16 and 16$^a$, and the shear cylinders 6 and 9 are preferably all cross connected together into a single operating valve in a manner adapted to move one stopping block 25 downwardly and then move the shear knife 5 on the shear 2 in front of which it is mounted through its cutting stroke, while the stopping block 25 in front of the other shear is caused to lift into its inoperative position, a corresponding movement of the shear knife 5 on the other shear 4 being made. By connecting the shear and stop actuating mechanisms together the shears and the stopping blocks are manipulated through the valve controlling the cutting movements of the knives on the shears by a single operative, although the parts may be connected to independent valves when so desired.

In the operation of my improved apparatus the parts are assembled as shown in the drawings. The cross head 11 is then adjusted lengthwise on the support 10, into position to locate the face of the shear stops 25 a sufficient distance in front of the face of the shear knives 4 and 5 to cut the materials into pieces of the desired length. The cross head 11 is moved on the support 10 into its several adjusted positions by means of the spur pinions 44 which are mounted on the carrier or cross-head and are arranged to engage with the toothed rack 10$^a$ on the support 10. The pinions 44 are rotated by the levers 45 on the outer end of the shafts 46 to which these pinions 44 are secured. After the crosshead has been so adjusted a pin 47 is inserted in registering holes 48 in the crosshead 11, and 49 in the sides of the support 10 so as to rigidly attach the cross head 11 to the crosshead support 10. The pins 38 and 39 also are shifted and put in the requisite holes 40 in the reach rods 37 so as to connect the bell cranks 28 with the plungers 20 and 21 forming part of the stop actuating mechanism. When in adjusting the reach rod it is found necessary to move the plungers 20 and 21 relatively to the crosshead 11, the pins 43 are removed and again placed in other of the holes 50 then found to be in register after such adjustment is made. The rollers 51 of the feed table leading to the shear are then rotated to move the metal being sheared lengthwise until its forward end is again in engagement with the face of the then depressed stopping block 25 and the shear knives 4 and 5 are then caused to approach so as to sever a piece of pre-determined length from the metal. The operating valve is then manipulated to cause the movable shear knife 5 to move in the opposite direction or away from its stationary shear knife and this same manipulation of the shear operating valve also admits fluid pressure into one or the other of the cylinders 15 and 16, at the same time connecting the port opening on the opposite cylinder 15ª or 16ª to the exhaust outlet opening in the valve, so that the plunger 20 or 21 is moved from left to right or in a direction which will lift the lower arm of the bell crank 28 and thereby raise or lift the stopping block 25. The rollers of the delivery table on the discharge side of the shear are then caused to rotate and move the sheared piece of material out of its position below the then lifted stopping block and at the same time the multiple length blank on the delivery side of the shear is again moved forwardly. After the sheared piece of material has been removed from beneath the shear stop the operating valve is again manipulated to reverse the movement of the plungers 20 and 21 so that the lifted stop is again lowered into position to be again engaged by the advancing forward end of the uncut portion of the metal being sheared. The above described operations are then repeated as required, the duplex shear being operated so that while one shear is being actuated through its cutting stroke the other is being retracted or moved in the opposite direction.

The advantages of my invention will be apparent to those skilled in the art.

Modifications in the construction and arrangement of the parts may be made without departing from my invention as defined in the appended claims.

I claim:—

1. A shear stop comprising a crosshead adjustably secured in front of the shear and having a substantially vertical opening therethrough, a stopping block mounted in said opening and arranged to move vertically therein into and out of operative position, and means for actuating said stopping block.

2. A shear stop comprising a crosshead adjustably secured in front of the shear and having a substantially vertical opening therethrough, a stopping block mounted in said opening and arranged to move vertically, and means for actuating said stopping block arranged to extend the lower end thereof below the bottom surface of said crosshead.

3. A shear stop comprising a crosshead adjustably secured in front of the shear and having an opening extending substantially vertically therethrough and a vertically movable stopping block mounted in said opening and arranged to move vertically therein into and out of operative position, said opening and stopping block having tapering faces arranged to wedge the stopping block in said opening when in its lowered operative position, and means for actuating said stopping block.

4. A shear stop comprising a crosshead support extending horizontally in front of the shear, an adjustable crosshead mounted thereon, means for securing the crosshead in adjusted positions on said support, a vertically extending downwardly tapering opening through the crosshead, a vertically extending stopping block movable in said opening into and out of operative position and means mounted on the crosshead support for actuating said stopping block on the crosshead.

5. A shear stop comprising a crosshead support extending horizontally in front of the shear, a movable crosshead adjustably mounted on the support, means for securing the crosshead in adjusted position thereon, a vertically extending opening in the crosshead, a stopping block mounted in said opening and arranged to move vertically therein into and out of operative position, mechanism mounted on said support for actuating the stopping block, and means adjustably connecting the stopping block and block actuating mechanism.

6. A shear stop comprising a crosshead support extending horizontally in front of the shear, a movable crosshead adjustably mounted on the support, means for actuating the crosshead on the crosshead support, means for securing the crosshead in adjusted position thereon, a vertically extending opening in the crosshead, a stopping block mounted in said opening and arranged to move vertically therein into and out of operative position, mechanism mounted on said support for actuating the stopping block, and means adjustably connecting the stopping block and block actuating mechanism.

7. The combination with a duplex shear of a horizotally extending crosshead support in front of said shear, an adjustable crosshead mounted on the support, vertically extending openings in said crosshead, vertically movable stopping blocks mounted in said openings and arranged to move into and out of operative position in front of the shear knives on said duplex shear, mechanism mounted on the crosshead support for actuating the stopping blocks, and means adjustably connecting the stopping blocks with the block actuating mechanism and arranged to move the stopping blocks into and out of operative position on said crosshead.

8. The combination with a duplex shear of a horizontally extending crosshead support in front of said shear, an adjustable crosshead suspended from the support, vertically extending openings in said crosshead, vertically movable stopping blocks mounted in said openings and arranged to move downwardly to project below the bottom surface of said crosshead into operative position in front of the shear knives on said duplex shear, mechanism mounted on the crosshead support for actuating the stopping blocks, and means adjustably connecting the stopping blocks with the block actuating mechanism and arranged to move the stopping blocks into and out of operative position on said crosshead.

In testimony whereof, I have hereunto set my hand.

GEORGE J. BRYEN.

Witnesses:
W. EARL LAUGHLIN,
J. BYRON NEWMEYER.